United States Patent [19]

Loercks et al.

[11] Patent Number: 5,006,140

[45] Date of Patent: Apr. 9, 1991

[54] PROCESS FOR THE MANUFACTURE OF MINERAL FIBRE COMPOSITIONS

[75] Inventors: Juergen Loercks, Rees-Androp; Horst Neisius, Kleve, both of Fed. Rep. of Germany

[73] Assignee: Cerestar Holding B. V., Sas Van Gent, Netherlands

[21] Appl. No.: 451,959

[22] Filed: Dec. 14, 1989

[30] Foreign Application Priority Data

Dec. 16, 1988 [GB] United Kingdom ............... 8829405

[51] Int. Cl.$^5$ ........................................... C03C 25/02
[52] U.S. Cl. .......................................... 65/3.1; 65/3.4; 65/3.41; 65/4.4; 106/210; 524/734
[58] Field of Search ............... 65/3.1, 3.41, 3.4, 4.4; 106/210; 524/734

[56] References Cited

U.S. PATENT DOCUMENTS

| | | | |
|---|---|---|---|
| 3,467,647 | 9/1969 | Benninga et al. | 106/210 X |
| 3,664,855 | 5/1972 | Morrison et al. | 65/3.4 X |
| 4,026,690 | 5/1977 | McClellan | 65/3.1 X |
| 4,233,046 | 11/1980 | Walser | 65/3.1 |
| 4,244,844 | 1/1981 | Molinier et al. | 65/3.1 X |
| 4,259,190 | 3/1981 | Fahey | 65/3.4 X |
| 4,397,913 | 8/1983 | Fahey | 65/3.1 X |
| 4,552,918 | 1/1985 | Löercks et al. | 524/734 |
| 4,592,956 | 6/1986 | Gaa et al. | 65/3.41 X |
| 4,681,805 | 7/1987 | Puckett | 65/3.41 |

FOREIGN PATENT DOCUMENTS 0044614 6/1981 European Pat. Off. .

OTHER PUBLICATIONS

Kirk Othmer, Encyclopedia of Chemical Technology, vol. 10, pp. 565, 566.
A. I. Sheyanova et al., Chemical Abstracts, vol. 101, No. 10, Sep. 1984, p. 301, 101:77655d.
Other Pub/European Search Report 89312889, Jan. 3, 1990.

*Primary Examiner*—Robert L. Lindsay
*Attorney, Agent, or Firm*—Cushman, Darby & Cushman

[57] ABSTRACT

A process for the production of a glass or other mineral fibre composition in which glass or other mineral fibre is melted, the molten glass or mineral is forced through a plurality of openings to produce fibres, the hot fibres are sprayed with a water disperion of a binder and the fibres are dried at an elevated temperature, the binder comprising a gelatinized starch sulphamate product and a hydrophobic agent such as a silicone. The gelatinized starch sulphamate may be preformed by reacting a starch with a sulphamate salt or may be formed in situ by spraying onto the hot fibres a water dispersion of pregelatinized starch and a sulphamate salt. In this latter case part of the pregelatinized starch may be replaced by native starch.

12 Claims, No Drawings

PROCESS FOR THE MANUFACTURE OF MINERAL FIBRE COMPOSITIONS

The present invention relates to the manufacture of mineral fibre compositions in particular to the manufacture of glass fibre mats used in the building construction industry.

Mats of glass or other mineral fibre are widely used in the building construction industry on account of their heat and sound insulating properties.

In a typical process for the manufacture of a glass fibre mat the glass, in particulate form, is fed from storage into a furnace where it is melted and the molten glass at a temperature about 1,000° C. forced through sieve-like openings usually under the influence of jets of high-pressure air which have an attenuating effect on the fibres produced. The glass threads leaving the openings solidify as a large number of fine fibres which are deposited on a conveyer as glass wool which subsequently passes through a drier where the wool is formed into mats which are cut to the desired size on leaving the drier.

In order to make the individual glass fibres adhere together to form the mat the fibres are treated with a binder. Conventional binders include in particular, phenol formaldehyde resins, melamine formaldehyde resins and urea formaldehyde resins. The binders are conveniently coated on the fibres by spraying the latter with an aqueous dispersion of the binder immediately after the fibres are formed, the water in the binder composition exerting a cooling effect on the fibres. Residual water is removed in the drier.

One problem which is encountered in using the formaldehyde based resins described above is the release of formaldehyde into the atmosphere when the resins are produced on site, and during the coating and drying stages of the process. In an increasingly environmentally conscious age this problem is becoming more and more acute and there is therefore every incentive to find a suitable and more environmentally acceptable binder replacement.

In European Patent No. 129227 a flame resistant starch product is described which is produced by reacting a pregelatinised starch with a specified sulphamate salt at 40 to 250° C. in the presence of at least 30% by weight water, based on the total weight of the reaction mixture. This product is said in the patent to have a wide range of uses i.e. as a component of adhesives and binders for paper, cardboard, building materials, insulating materials, composite materials, paints, sizing agents, coating media, plastics, textiles, glass and mineral fibres and moulded bodies of powdery or granulated material. We have confirmed that the starch products described in 129227 are suitable as replacements for at least part of the formaldehyde resin binder presently used in a glass or mineral fibre mat production process despite the agressive temperature conditions existing in that process. We have found that the starch sulphamate products may be preformed or may be formed in situ following the application of the binder to the fibre. We have also found that to be fully effective the binders made from starch sulphamates, whether preformed or formed in situ on the fibre, should also comprise a hydrophobic agent. In certain circumstances it appears that sulphamates made from degraded starches possess advantages in such binder compositions.

Accordingly, the invention comprises a process for the production of a glass or other mineral fibre composition in which glass or other mineral is melted, the molten glass or mineral is forced through a plurality of openings to produce fibres, the hot fibres are sprayed with a water dispersion of a binder, and the fibres are dried at an elevated temperature, the binder comprising a gelatinised starch sulphamate product and a hydrophobic agent.

The starch may be a native starch or a degraded starch e.g. maize starch, wheat starch or any other commercially available starch. It is also possible, and in some instances beneficial to use a starch which is substituted by a monofunctional substituent e.g. by an ester or ether group.

By "degraded starch" we mean a starch which has had its molecular weight reduced by known physical or chemical means. For example, the starch may be treated with an acid or with an enzyme or, preferably, it may be oxidised. Degradation by physical means may be effected by submitting the starch to elevated temperature and pressure e.g. at 110° to 180° C and 2 to 12 bar pressure either in a converter or extruder. Combinations of two or more of these methods of degradation may also be used.

A suitable oxidised starch may be made by using a hypochlorite oxidising agent e.g. sodium hypochlorite and the product preferably has a carboxyl content of 0.30% to 0.80%.

The starch is preferably degraded to such an extent as to give a product with a Brookfield viscosity of between 10 mPas and 400 mPas preferably between 20 mPas and 120 mPas for a 10 weight % solution at 20° C. Degraded starch sulphamates have a lower viscosity at equal solids content than native starch sulphamates and for this reason are easier to handle.

Commercial starch esters are derived from the lower fatty acids, e.g. acetyl or propionyl esters while commercially available starch ethers may be produced by reacting starch with an olefin oxide, particularly with propylene oxide. The substituted starch should not be cross-linked by the substituting reagent, therefore the reagent should be monofunctional with respect to the starch. The acetyl starch product is technically effective and because it is the cheapest substituted starch to prepare it is preferred if a substituted starch is used in the process of the invention. The effect of the substituent in the starch molecule is to produce a product which has a viscosity which is less sensitive to temperature changes than the unsubstituted starch. The extent of the substitution is preferably such as to give a product having a Brookfield viscosity of 10 to 400 mPas for a 10 weight % solution at 20° C.

The gelatinised starch sulphamate may be prepared by the process described in European patent 129 227, i.e. 3 to 40% by weight sulphamate salt based on starch is used in the presence of at least about 30% by weight water and the temperature of the reaction is 40° to 250° C. As an alternative to preforming the starch sulphamate, pregelatinised starch or a mixture of pregelatinised and native starch may be mixed with a sulphamate salt to provide a composition which may be dispersed in water for use in the process of the invention. In this way reaction with the sulphamate, or gelatinisation and reaction with the sulphamate may take place in situ on the hot glass fibers and particularly when the fibres are dried.

The sulphamate salt used may be an alkali metal salt, an alkaline earth metal salt or the ammonium salt of sulphamic acid. Preferably the salt is calcium or ammonium sulphamate. The amount of sulphamate used is suitably 5 to 35, preferably 7.5 to 30, more preferably 10 to 25 weight % based on the starch.

The binder also comprises a hydrophobic agent which has the aim of making water repellant the glass fibres bound with the starch. Although any hydrophobic agent may be used which is compatible with the ingredients of the binder and which does not have an adverse effect on the process or on the mineral fibre product we have found that in general silicones are the best class of hydrophobic agents for use in the process. More particularly, the most effective silicones are those which comprise functional groups which are reactive with starch hydroxyl groups especially at temperatures at which the glass fibre mat is dried i.e. at 150° to 250° C. Typical silicone groups are hydroxyl, amino and alkoxy groups. The amount of hydrophobic agent which is used in the binder is suitably 0.1 to 20, preferably 0.1 to 10 weight % based on starch, more preferably 0.3 to 5.0 weight %. The hydrophobic agent may be included in the sulphamate starch/water composition which is sprayed onto the fibres but is is also possible for the hydrophobic agent to be sprayed onto the fibre separately so that is first comes into contact with the starch and sulphamate on the glass fibre.

The binder may also contain other ingredients, e.g. a surface active agent or a softening agent and, in particular, a preservative to prevent microbiological attack on the starch binder when the mineral fibre mats are in service. Di-thiocarbamates are useful preservatives for this purpose which may be used at 0.5 to 3.0 weight % based on starch.

From the foregoing description it will be seen that in the production of the starch sulphamate product for use in the process of the invention the starch is submitted to two, possibly three, operations namely, reaction with a sulphamate salt, gelatinisation, and, optionally, degradation. The two essential reactions may be carried out successively or simultaneously, e.g. the starch may be gelatinised, then reacted with the sulphamate salt to provide a colloidal solution or, native starch and the sulphamate salt may be introduced into a converter and there heated under pressure when simultaneous gelatinisation, reaction with the sulphamate salt and probably degradation occur to form a colloidal solution. Generally, the reaction of the sulphamate salt with the pregelatinised starch or the simultaneous gelatinisation and reaction with the sulphamate salt results in the formation of a colloidal solution which is the desired form of the product for use in the process of the invention. The flexibility inherent in the production of the starch sulphamate may be used to advantage in chosing where to produce the starch sulphamate for use in the production of the mineral fibre composition. Thus, the starch producer may make the colloidal solution of the starch sulphamate and supply it as such to the producer of the mineral fibre composition. The starch producer may, however, provide a slurry of native starch, optionally containing a sulphamate salt and the producer of the mineral fibre may produce the colloidal solution e.g. in a high temperature, high pressure converter after adding sulphamate salt when necessary.

The water dispersion sprayed onto the fibres may be a solution and/or a suspension but is preferably a colloidal solution.

The water dispersion may contain 1 to 20% by weight binder preferably 4 to 12% by weight and this may be made up of more than 30%, more preferably more than 60% especially 100% of starch sulphamate product and hydrophobic agent. If the binder is not composed 100% by the latter combination it may also comprise a conventional binder, particularly a phenol formaldehyde, melamine formaldehyde or urea formaldehyde resin. Aqueous compositions which may be applied to the glass fibre to form the binder comprise preferably, (a) native starch sulphamate and a hydrophobic agent;
(b) pregelatinised native starch, a salt of sulphamic acid and a hydrophobic agent;
(c) native starch, pregelatinised starch, a salt of sulphamic acid and a hydrophobic agent;
(d) composition (a), (b) or (c) in which part or all of the starch is degraded.

Apart from the nature of the binder the conditions of the fibre composition production process are those in conventional use e.g. the molten glass temperature may be 1000° to 1400° C and the temperature in the drier 150° to 250° C. The use of conventional conditions is one of the advantages of the present invention since it enables a change in binder to be made with the minimum of disruption to the existing process.

The invention will now be further described with reference to the following Examples. The Examples describe the preparation of a number of different binder compositions which were evaluated in a commercial plant manufacturing fibre glass mats. The molten glass was held at a temperature of 1200° C. and when ejected the fibres were cooled with air and then sprayed with the binder under test. The glass wool which was formed from the fibres was formed into mats and dried at 140° C.

EXAMPLE 1

Preparation of the oxidised, acetylated starch

Maize starch was reacted with sodium hypochlorite to give an oxidised product having a viscosity at 20° C. of 30 to 50 mPas at a concentration of 10 weight % dissolved solids.

The oxidised product was acetylated with acetic anhydride to an acetyl value of approximately 1% acetyl based on the oxidised, acetyl starch. The Brookfield viscosity of the 10 weight % dissolved solids aqueous solution was 20 mPas.

The oxidised, acetyl starch was then mixed with 10 weight % based on starch dry substance of ammonium sulphamate and the starch gelatinisation and reaction with the sulphamate effected at 70° to 90° C. on heated rollers.

The reaction product was mixed with water to form a colloidal solution having 27.5 weight % dry substance, pH value 5.7 and viscosity of 140 mPas at 50° C. and 360 mPas at 20° C.

The colloidal solution was further diluted with water to a concentration of 8 weight % dry substance and the following added :

1.5 weight % (based on starch) dithiocarbamate (preservative)
3 weight % (based on starch) silicone resin
0.4 weight % (based on starch) surface active agent
6.0 weight % (based on starch) urea softening agent.

This composition was evaluated in the commercial process producing glass fibre mats and proved effective as the total replacement for the customary formaldehyde resin binder, the glass fibre mats having the required density and elasticity.

EXAMPLE 2

The colloidal solution of the oxidised, acetyl starch sulphamate product prepared as in Example 1 above was blended with an aqueous slurry containing 45 weight % dry substance of corn starch (100 parts), ammonium sulphamate (16 parts), silicone resin (3 parts) and dithiocarbamate (1.5 parts). Two blends containing respectively 70% and 50 weight % by weight oxidised, acetyl starch sulphamate based on total starch content were made up and tested in the commercial process referred to in Example 1. Both proved satisfactory as the total replacement for the customary formaldehyde resin binder.

EXAMPLE 3

Native maize starch was mixed with 10 weight % ammonium sulphamate based on starch dry substance and 60 weight % water and heated on rollers at 70° to 90° C.

The reaction product was mixed with water to give a colloidal solution having 20 weight % dry substance and a viscosity of 140 mPas at 50° C. and 360 mPas at 20° C.

The colloidal solution was diluted with water to a concentration of 8 weight % dry substance and 3 weight % (based on starch) of a silicone, SITREN 534 added ("SITREN" is a trademark and SITREN 534 is a 50% aqueous emulsion of a silicone derived from dimethyldichlorosilane containing NH$_2$ and OC$_2$H$_5$ functional groups). A dithiocarbamate, 1.5 weight %, (based on starch) was also added and the resulting composition was evaluated as the sole binder in the production process described above. The glass fibre mat produced was very satisfactory with respect to the relevant properties of density and elasticity.

EXAMPLE 4

Example 3 was repeated replacing SITREN 534 by SITREN 447 (a 50% aqueous silicone emulsion derived from dimethyldichlorosilane and containing OH functional groups). The glass fibre mat which was produced was equivalent in properties to that produced in Example 3.

EXAMPLE 5

Pregelatinised starch was mixed with water to give a 10 weight % colloidal solution to which was added 12 weight % ammonium sulphamate (based on dry substance). The colloidal solution was further diluted with water to a concentration of 6 weight % dry substance and 3 weight % (based on starch) SITREN 534 and 1.5 weight % (based on starch) dithiocarbamate added. The composition was evaluated as described above, the glass fibre mat which was produced meeting the critical density and elasticity requirements. Similar satisfactory results were obtained when 30 weight % of the pregelatinised starch was replaced in the formulation by granular native starch.

EXAMPLE 6

Native maize starch was mixed with 10 weight % ammonium sulphamate and the resulting solid composition heated with 70 weight % water in a cooker at 120° C. to produce a colloidal solution which was subsequently diluted to 8% dry substance and, after the addition of 3 weight % (based on starch) SITREN 447 and 1.5 weight % (based on starch) dithiocarbamate, successfully evaluated in the glass fibre mat production process.

We claim:

1. A process for the production of a mat of glass or other mineral fibre composition having heat and sound insulating properties and enhanced water resistance comprising, melting glass or other mineral, forcing the molten glass or mineral through a plurality of openings to produce fibres, spraying the hot fibres with a water dispersion of a binder comprising a gelatinized starch sulphamate product and a hydrophobic agent, depositing the fibres on a conveyer as glass wool, passing the glass wool through a drier where the fibres are dried at an elevated temperature and the wool is formed into a mat.

2. A process according to claim 1 in which the starch is a native starch or a degraded starch.

3. A process according to claim 2 in which the starch has been degraded by acid, by an enzyme, by oxidation or by heating to an elevated temperature and pressure.

4. A process according to claim 2 or claim 3 in which the starch is degraded to give a product having a Brookfield viscosity between 10 mPas and 400 mPas for a 10% by weight solution at 20° C.

5. A process according to claim 1 or 2 in which the starch is substituted by a monofunctional substituent.

6. A process according to claim 1 or 2 in which the hydrophobic agent is a silicone.

7. A process according to claim 6 characterised in that the silicone contains functional groups which are reactive with starch hydroxyl groups at the temperature at which the glass fibre mat is dried.

8. A process according to claim 7 characterised in that the functional groups are hydroxyl, amino or alkoxy groups.

9. A process according to claim 1 or 2 in which the binder comprises a microbiological preservative.

10. A process according to claim 1 or 2 in which the binder comprises 0.1 to 10 weight % hydrophobic agent, and 0.5 to 3.0 weight % preservative based on starch.

11. A process according to claim 1 or 2 in which the water dispersion comprises 1 to 20% by weight of binder.

12. A process according to claim 1 or 2 in which a composition to be applied to the glass fibre to form the binder is selected from the group consisting of:
 (a) native starch sulphamate with a hydrophobic agent and microbiological preservative;
 (b) pregelatinized native starch, a salt of sulphamic acid and a hydrophobic agent and microbiological preservative;
 (c) native starch, pregelatinized starch, a salt of sulphamic acid and a hydrophobic agent and microbiological preservative; and
 (d) the composition (a), (b) or (c) in which part of all of the starch is degraded.

* * * * *